United States Patent Office 3,705,820
Patented Dec. 12, 1972

3,705,820
TONGUE FOR WIND INSTRUMENTS AND A METHOD FOR PRODUCING SAME
Karl Knotik, Eisenstadt, and Franz Gutlbauer, Baden, Austria, assignors to Osterreichische Studiengesellschaft fur Automenergie Ges. m.b.H., Vienna, Austria
No Drawing. Filed Apr. 20, 1970, Ser. No. 30,220
Claims priority, application Austria, Apr. 21, 1969, 3,840/69
Int. Cl. B44d 1/50
U.S. Cl. 117—93.31        6 Claims

ABSTRACT OF THE DISCLOSURE

A tongue or reed for a wind instrument, made of cane or another kind of reed is treated with a resin, especially a synthetic resin. After the tongue has been treated with this resin the same is cured.

---

The invention relates to a tongue for wind instruments as well as to a method for its production. Tongues made of a reed are used for instance with clarinets, saxaphones, oboes, bassoons and the like.

The usual tongues made of cane and like material are sensitive as to humidity. They get soaked during the playing by the humidity of the mouth and swell, lose elasticity and have to be often replaced as they get worn out quickly. Besides it is difficult in most cases to find a spare tongue having the same good musical properties, which tongue also corresponds with respect to sensibility, to the imaginations of the musician. For removing these deficiencies at least partly, it has been proposed to make the tongues from synthetic resins and, if necessary to reinforce same with glass fibres. These tongues have until now not been accepted by the musician as they give a strange feeling on account of their structure and as they also influence the timbre and modulation.

As a solution of this complex problem it is now proposed by the invention to impregnate usual reed tongues with components in a way that the ability of the material to swell is reduced and thus the strength against wear is improved, all other properties of the material however are maintained.

The tongue according to the invention is characterized in that it is made from a conventional material like cane or another kind of reed, and that it is treated with a resin, especially a synthetic resin.

The treatment makes it necessary that the porous tongue is immersed for a short time with its sharpened end into the primary material of the resin, thus a part of the pores is filled, but the tongue is not impregnated completely throughout its volume. Then the impregnation material is polymerized by a heat treatment or more advantageously by radiation. The irradiation is effected for instance by an electromagnetic radiation like gamma ray or X-rays. Also particulate radiation like alpha-particles and beta-radiation (electrons) of radioactive isotopes as well as high energetic electrons from accelerators can be used. It has been found that for the polymerization, ionizing radiation having an overall dose between 10 krad and 20,000 krad is necessary and that the same has no disadvantageous effects on the timbre and modulation. Optimal results have been gained with doses of 500 krad to 5000 krad. Thereby the monomer is completely polymerized, thus no alterations as to smell or taste have been found.

A catalyst or a hardening addition to the monomer as well as the removal of inhibitors from the monomer is not necessary with the radiochemical polymerization. Thus, resin-like products being present in the reed which could have the effect of inhibitors as to polymerization, do not cure trouble if the explained method is used. A special advantage of the radiochemical polymerization for the improvement of the reed is given by the independence from temperature. In a usual treatment the reaction has to be started at a higher temperature and the heat produced during the polymerization can easily effect a local superheating. This might cause a warping of the thin tongue portion which has a disadvantage on the timbre and modulation. This disadvantage is removed in the irradiation process. The polymerization can be started with room temperatures and the velocity of the polymerization is controlled by the dose. If between the impregnation and the hardening, a part of the resin component is evaporated from the surface (perhaps by a vacuum) then the tongue is hardly altered in its specific surface and transmits an habitual sense of an untreated tongue to the lips of the musician. To a certain degree this can also be gained if the tongue is impregnated without the intermediate treatment and is then ground at the surface.

The hardness and the elasticity of the tongue can likewise be adapted to the taste of the musician by a grinding or a burning of the end as this is usual.

The invention will now be explained by way of some examples.

EXAMPLE 1

A reed for a clarinet (Dichard, Golden Cane Reed) having a hardness of 2.5 in accordance with the scale which is divided into nine steps, was immersed for 10 seconds into the prepolymerized monomer Degalan S 85 (a resin by Degussa, based on methylmethacrylate) to which 1% of the hardening components RM and LP (Degussa) had been added. Afterwards the resin coating was cured at 60° C. for 8 hours in a dryer. The reed so treated was less sensitive to humidity and the strength against wear was essentially increased. Moreover, it had a higher hardness than untreated reed, the increase of hardness was between 0.5 and 1.

EXAMPLE 2

A reed for a clarinet according to Example 1 was immersed for 10 seconds into Degalan S 85 to which 1% of the hardening components RM and LP was added. The curing of the resin coating was effected by way of a radiation having a high energy. The irradiation was carried out at room temperature with a Co-60-gamma radiation plant having an output of 300 krad per hour, the irradiation was effected for 6 hours.

EXAMPLE 3

A reed for a clarinet was treated according to Example 2 with the exception that no hardening components were added to the prepolymerized monomer.

EXAMPLE 4

A reed for a clarinet was treated according to Example 2 with the exception that the reed was immersed for 10 minutes into methacrylacidmethylester (stabilized with 0.05% hydrochinon, Fluka) without the prior removal of the stabilizer.

EXAMPLE 5

A reed for a clarinet was treated according to Example 2 with the exception that the reed was immersed for 10 minutes into a monomer mixture of styrene (stabilized, Fluka) and acrylacidnitrile (Fluka), 60:40% without prior removing of the stabilizer.

EXAMPLE 6

A reed for a clarinet was treated according to Example 2 with the exception that the reed was immersed for 10 seconds into linseed oil. After an irradiation of 6 hours the reed was air-dried until it was completely free of any smell.

EXAMPLE 7

A reed for a bassoon was immersed for 10 minutes into methacrylacidmethylester (stabilized with 0.05% hydrochinon, Fluka), the stabilizer being not removed, and was then further treated according to Example 2. The resin soaked reed was less sensitive to humidity and the strength against wear was clearly increased.

Also with the reeds according to the Examples 2 to 7 it has been found that they are less sensitive as to humidity and are thus less weared off. The blowability was unchanged and corresponds to an untreated reed the hardness of which is higher by about 1 step.

The invention is not restricted to the explained examples. Other resins can of course be used, too. Moreover, flavors can be added to the resins.

We claim:

1. A method of producing a tongue blade for wind instruments, comprising the steps of
partially soaking a reed with a composition consisting of partially polymerized pure methylmethacrylate,
polymerizing said composition by subjecting said reed to ionizing radiation within total doses of from 10 krad to 20,000 krad.

2. The method, as set forth in claim 1, wherein said total doses are between 500 to 5,000 krad.

3. The method, as set forth in claim 1, further comprising the step of hardening said composition by a combination of said radiation and a temperature treatment below 150° C.

4. The method, as set forth in claim 3, wherein said total doses are between 500 to 5,000 krad.

5. The method, as set forth in claim 1, further comprising the step of mechanically roughening said reed for obtaining a surface similar to a non-treated reed.

6. The method, as set forth in claim 3, further comprising the step of partially removing said composition from the surface of said reed by evaporation, prior to said hardening for obtaining a surface similar to a non-treated reed.

References Cited

UNITED STATES PATENTS

| 3,464,853 | 9/1969 | La May | 117—148 |
| 3,407,088 | 10/1968 | Feibush et al. | 117—93.31 |

OTHER REFERENCES

Gibson et al.: "Dimensional Stabilisation of Wood," J. Appl. Chem., vol. 16, February 1966, pp. 58–64.

ALFRED L. LEAVITT, Primary Examiner

J. H. NEWSOME, Assistant Examiner

U.S. Cl. X.R.

84—383; 117—148; 204—159.16